United States Patent
Srivastava et al.

[11] Patent Number: 6,049,418
[45] Date of Patent: Apr. 11, 2000

[54] NOISE FIGURE IN OPTICAL AMPLIFIERS WITH A SPLIT-BAND ARCHITECTURE

[75] Inventors: Atul Kumar Srivastava; James William Sulhoff; Yan Sun, all of Monmouth County; Paul Francis Wysocki, Hunterton County, all of N.J.

[73] Assignee: Lucent Technologies, Inc., Murray Hill, N.J.

[21] Appl. No.: 09/089,863

[22] Filed: Jun. 3, 1998

Related U.S. Application Data

[60] Provisional application No. 60/073,953, Feb. 6, 1998.

[51] Int. Cl.[7] .................................................. H01S 3/00
[52] U.S. Cl. .................................... 359/341; 359/345
[58] Field of Search .................................. 359/341, 124, 359/345

[56] References Cited

U.S. PATENT DOCUMENTS

| | | | |
|---|---|---|---|
| 5,392,154 | 2/1995 | Chang et al. | 359/341 |
| 5,867,306 | 2/1999 | Isshiki | 359/341 |
| 5,905,838 | 5/1999 | Judy et al. | 385/123 |
| 5,978,130 | 11/1999 | Fee et al. | 359/341 |

FOREIGN PATENT DOCUMENTS 0883218  9/1998  European Pat. Off. .

OTHER PUBLICATIONS

Yamashita et al; "$Er^{3+}$ doped fibre pre–amplifier with subsidiary EDF for application in WDM systems using two separate wavelength bands of 1.53 and 1.55 $\mu$m" Electronic Letters, vol. 31, No. 18.

*Primary Examiner*—Mark Hellner

[57] ABSTRACT

A wideband optical amplifier employs split-band architecture in which an optical signal passes through a common amplification stage and is then split to pass through parallel gain stages, each of which may be optimized for a particular band being traversed. A broadband grating reflector is used after the input gain section to reflect the signals of one of the bands so that they again will pass through the common input gain section before passing through gain section of the split structure dedicated to their particular wavelength. Meanwhile, the other signals pass through the reflector and move on through the gain section pertinent to their wavelength.

13 Claims, 2 Drawing Sheets

NOISE FIGURE IN OPTICAL AMPLIFIERS WITH A SPLIT-BAND ARCHITECTURE

This application claims the benefit of U.S. Provisional Application No. 60/073953 filed Feb. 6, 1998.

FIELD OF THE INVENTION

This invention relates to broadband amplifiers for wavelength division multiplex optical communication networks and, more particularly, to the use of erbium-doped fiber amplifiers (EDFA).

BACKGROUND OF THE INVENTION

Previous work reported by J. F. Massicott, et al, in *Elect. Lett.*, 1990, vol. 26, pp. 1645–1646, has shown that optical gain can be obtained in erbium-doped silica fibers in the long wavelength range between 1570 and 1600 nanometers (L-band). It is more recently reported by Y. Sun, et al, in *Proc. Opt. Amplifiers and Their Appl.*, PD2 Canada, July, 1997 and in *Proc. ECOC.*, PDP 69, Edingburgh, U.K., September 1997, that by combining the gain in the conventional wavelength range between 1525 and 1565 nm (C-band) and the gain of the L-band, a bandwidth of 80 nm can be obtained using a split band EDFA structure.

The ultra wide band EDFA is physically divided into two (or more) sections. The first section includes a common amplification stage in order to achieve a good noise figure. In the second section the optical channels are split into separate parallel channels for amplification, one for the C-band and one for the L-band. Demultiplexing into the separate parallel channels may be accomplished by the combination of a circulator and a broad band fiber. A similar circulator and Bragg grating after the parallel channels can be used to re-multiplex the signals and an additional common output section to increase output power can be added, if desired.

While the common amplification stage improves noise figure, the improvement in the L-band is not as good as in the (-band because the gain of the first stage for the L-band is much lower than for the C-band. The loss associated with demultiplexing after the input gain stage increases the noise figure of the L-band more than the C-band. Accordingly, it would be advantageous to have a split-band optical amplifier architecture in which the input gain section yielded high gain for the L-band while maintaining high C-band gain.

SUMMARY OF THE INVENTION

This application incorporates by reference the disclosure of application Ser. No. 08/498112 filed May 15, 1998 entitled "Wide Band Optical Amplifier" and assigned to the assignee of the present invention. In accordance with the principles of the invention, in one illustrative embodiment thereof, a circulator is used in the input gain section, instead of the input isolator that was employed in the prior art. A broadband grating reflector is used after the input gain section to reflect the L-band signals so that the L-band signals pass through the common input gain section twice. The L-band signals are then directed by the circulator to a dedicated L-band gain section of the split structure. Meanwhile, the C-band signals pass through the reflector and move on to a dedicated C-band gain section of the split structure.

In another illustrative embodiment, a C-band broadband grating reflector is employed after the input gain section. C-band signals pass through the common input gain section twice, while the L-band signals and pump pass through the grating reflector and travel through the rest of the erbium-doped fiber.

BRIEF DESCRIPTION OF THE DRAWING

The foregoing and other features of the present invention may become more apparent from a reading of the ensuing description when read together with the drawing, in which.

GENERAL DESCRIPTION

Figure 1:
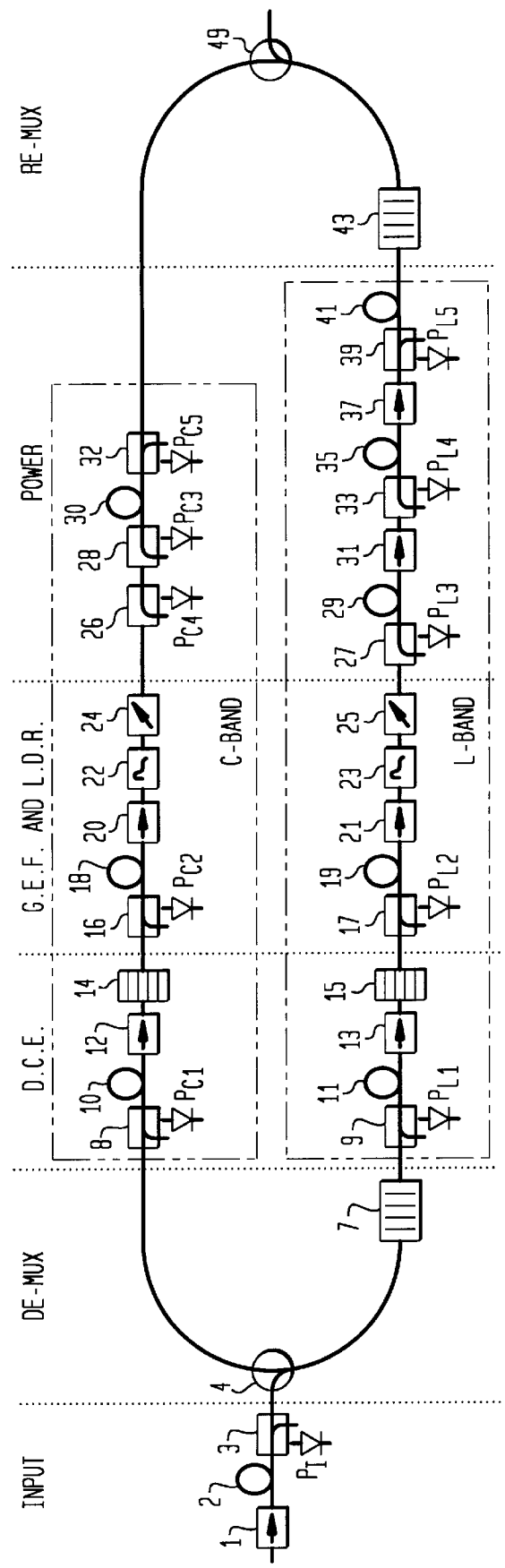
FIG. 1 shows a prior art ultra wide band erbium-doped fiber amplifier.

Referring to FIG. 1, a prior art ultra wide band EDFA has a first common amplification section which includes an isolator 1, erbium-doped fiber 2, wavelength division multiplexer 3 and 980 nm counter-pump diode laser $P_I$. The use of the counter-pump laser in the input gain section improves noise figure with sufficient pump power. After the input gain section, the optical channels are split (de-multiplexed) into two bands by circulator 4 and broad band fiber Bragg grating reflector 7. The C-band extends between approximately about 1525 and 1565 nm while the L-band covers between about 1570 and 1600 nm. In order to achieve the same gain for the C- and L-bands, the overall length of the erbium-doped fiber (11, 19, 29, 35, 41) for the L-band channel is longer than for the C-band channel because the gain per unit length for the L-band is lower than for the C-band.

After the input gain stage, the de-multiplexed C-band optical channel signals enter a dispersion compensating section in which gain is provided by wavelength division multiplexer 8 and 980 nm co-pump diode laser $P_{C1}$, erbium-doped fiber 10 and isolator 12, followed by dispersion compensating element 14. Thereafter, the C-band signals encounter the gain equalization filter and large dynamic range (G.E.F. & L.D.R.) section which includes wavelength division multiplexer 16 and 980 nm co-pump diode laser $P_{C2}$, erbium-doped fiber 18, isolator 20, gain equalization filter 22 and attenuator 24. Next, the C-band signals enter the power stage which includes wavelength division multiplexer 26 and 1480 nm diode laser co-pump $P_{C4}$ followed by wavelength division multiplexer 28 and 980 nm laser co-pump $P_{C3}$; erbium-doped fiber 30 and finally wavelength division multiplexer 32 and 1480 nm laser counter pump $P_{C5}$.

In the L-band optical channel, after the de-mux stage the signals enter a dispersion compensating section which includes wavelength division multiplexer 9 and 980 nm co-pump laser $P_{L1}$, erbium-doped fiber 11, isolator 13 and dispersion compensating filter 15. Next the L-band signals enter an equalization filter and large dynamic range section (G.E.F. & L.D.R.) which includes wavelength division multiplexer 17 and diode laser co-pump $P_{L2}$; erbium-doped fiber 19; isolator 21; gain equalization filter 23 and attenuator 25. The power stage includes wavelength division multiplexer 27 and 980 nm co-pump $P_{L3}$; erbium-doped fiber 29, isolator 31, wavelength division multiplexer 33 and 1480 nm co-pump $P_{L4}$, isolator 37; wavelength division multiplexer 39 and 1480 nm co-pump $P_{L5}$. Finally, both the C-band and L-band sections are re-multiplexed by broad band fiber Bragg grating reflector 43 and circulator 49.

As noted, while the common amplification stage (isolator 1, erbium-doped fiber 2, wavelength division multiplexer 3 and counter-pump laser $P_f$) improves noise figure, the improvement in the L-band is not as good as in the C-band because the gain of the first stage for the L-band is much lower than for the C-band.

Figure 2:
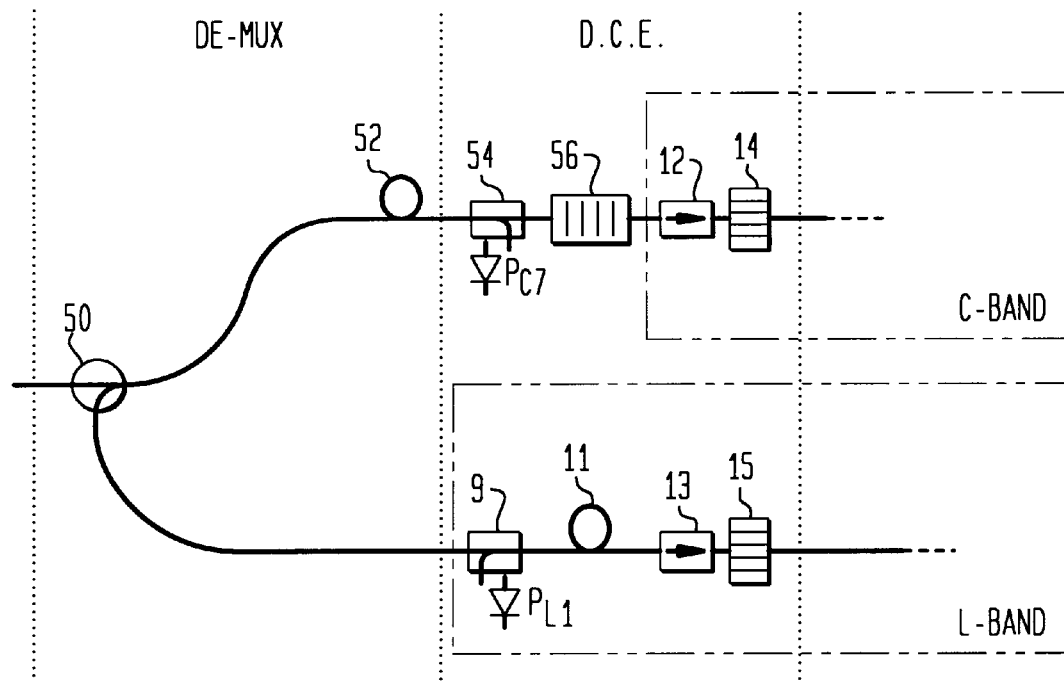
FIG. 2 shows one embodiment of the present invention.

Referring now to FIG. 2, one embodiment of our invention is shown. In accordance with our embodiment, a common C-band and L-band optical input gain section now includes circulator 50, erbium-doped fiber 52, wavelength division multiplexer 54 and 980 nm counter pump $P_{C7}$ and broad band grating reflector 56. The C-band signals pass through broad band grating reflector 56 while the L-band signals are reflected and pass through the common input gain section (wavelength division multiplexer and 980 nm diode laser counter pump 54, fiber 52, and circulator 50) a second time. The reflected L-band signals are then directed by the circulator 50 to the dedicated L-band gain section which begins with the dispersion compensating section comprising wavelength division multiplexer 9 and 980 nm diode laser co-pump $P_{L1}$; erbium-doped fiber 11, isolator 13 and dispersion compensating element 15. The G.E.F. & L.D.R and Power sections of the L-band channel are similar to the corresponding sections of FIG. 1.

Meanwhile, the C-band signals, after passing through reflector 56, move on through the isolator 12 and dispersion compensating element 14 and the remaining G.E.F & L.D.R. and Power sections of the C-band gain section as in FIG. 1.

Figure 3:
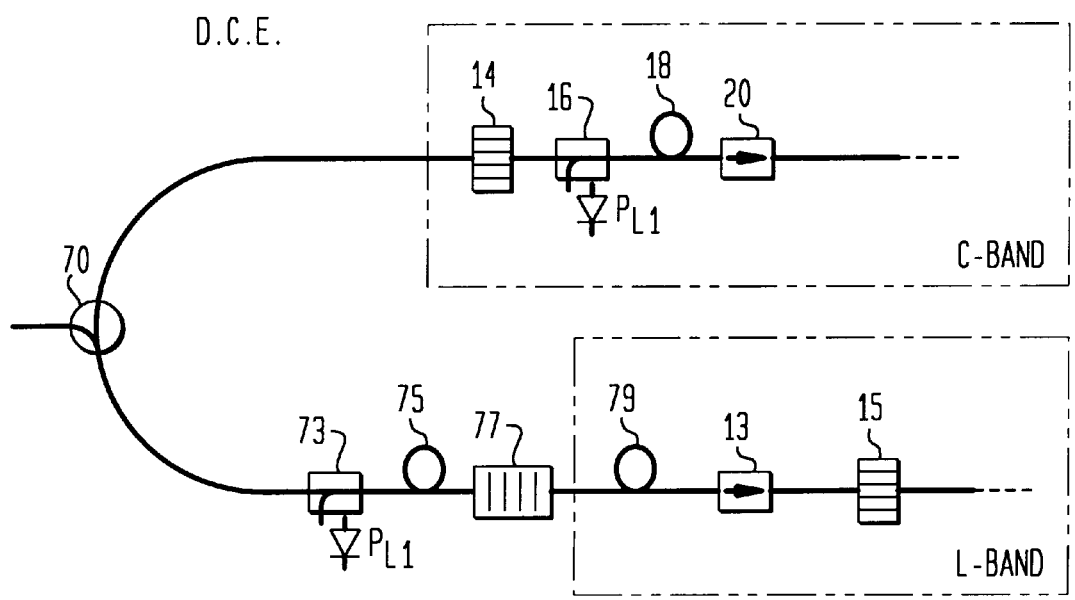
FIG. 3 shows an alternative embodiment of the invention.

FIG. 3 shows another illustrative embodiment. In FIG. 3 the C-band optical channel is assumed to contain components substantially similar to those of FIG. 1. The L-band. and C-band signals pass through a common input section which includes circulator 70, wavelength division multiplexer 73 and 980 nm diode laser pump $P_{L1}$, and erbium-doped fiber 75. The L-band signals pass through C-band broadband grating reflector 77 and continue on through erbium-doped fiber 79, isolator 13 and dispersion compensating element 15 and thence through the remainder of the L-band channel. The C-band signals, after passing through fiber 75 are reflected by reflector 77 and caused to pass through the common input section (erbium-doped fiber 75, wavelength division multiplexer 73 and circulator 70) a second time. From circulator 70 the C-band signals flow through the C-band section of the split structure. The L-band signals passing through fiber 75 also pass through grating reflector 77 and travel through another section of erbium-doped fiber 79 which is optimized to provide high gain in the L-band. Depending on design, a counter pump can be added before isolator 13 of FIG. 3. Then the L-band signals travel through the rest of the L-band optical channel in similar fashion to FIGS. 1 or 2.

What has been described is deemed to be illustrative of the principles of our invention. It should be understood that the C-band and L-band optical channels may each include additional (or fewer) wavelength division multiplexers, isolators, attenuators, pumps and erbium-doped fiber. The pumping direction can be changed and some of the components can be switched in position. One example is that in FIG. 2 the position of the Bragg reflector 56 can be interchanged with that of wavelength division multiplexer 54 and co-pump $P_{C7}$. The same designs apply to other types of optical amplifiers also, such as fluoride fiber optical amplifiers. The components involved can be made with different technologies. For example, the broad band reflectors can be made with either fiber gratings or thin film technologies. The idea discussed above applies also to multiple reflectors for multiple bands. With more than two bands, two or more of the bands can share part of one or more gain stages. In other words, what we have described above for two bands could be done for more bands using multiple reflectors to improve flatness. Further and other modifications may be made by those skilled in the art without, however, departing from the spirit and scope of our invention.

What is claimed is:

1. A broadband amplifier for wavelength division multiplex optical communication networks including a common amplification stage for delivering wave energy to a first and second optical channel respective to a first and second band within said broadband, the improvement comprising:

means in said first optical channel for reflecting said second band energy back through said common amplification stage for delivery to said second optical channel.

2. A broadband amplifier according to claim 1 wherein each said optical channel includes gain elements.

3. A broadband amplifier according to claim 2 wherein each said optical channel includes gain elements respective to one of said bands.

4. A broadband amplifier according to claim 3 wherein each said optical channel includes gain elements optimized for a respective to one of said bands.

5. A broadband amplifier according to claim 1 further including means in said second optical channel for reflecting said first band energy back into said common amplification stage for delivery to said first optical channel.

6. A broadband amplifier according to claim 1 wherein said common amplification stage includes a circulator, erbium-doped optical fiber and a wavelength division multiplexer pump.

7. A broadband amplifier according to claim 1 wherein said common amplification stage includes a circulator, erbium-doped optical fiber and a wavelength division multiplexer pump for accommodating both L-band and C-band signals; wherein said first optical channel is a C-band optical channel and wherein said means in said first optical channel for reflecting said L-band energy back through said common amplification stage for delivery to said L-band optical channel is a broadband grating reflector.

8. A broadband amplifier according to claim 4 further including means in said second optical channel for reflecting said first band energy back into said common amplification stage for delivery to said first optical channel.

9. A method of providing broadband amplification for optical signals encompassing two or more optical bands comprising the steps of a) passing said signals through an amplification stage;

b) splitting said signals emerging from said amplification stage into separate optical channels; one of said channels providing greater gain for the signals in one of said optical band than is provided for others of said signals; and c) reflecting at least one of said others of said signals to again pass through said amplification stage.

10. A method of providing broadband amplification according to claim 9 further comprising the step of recombining the signals emerging emerging from said optical channels into an output signal.

11. A broadband amplifier for wavelength division multiplex optical communication networks comprising:

a) a common amplification stage;

b) a first and second optical channel respective to a first and second band within said broadband for receiving energy from said common amplification stage; and c) means for reflecting said second band energy back through said common amplification stage for delivery to said second optical channel.

12. A broadband amplifier according to claim 11 further comprising means for recombining said first and second band energy from said first and second optical channels into a common output signal.

13. A method of providing broadband amplification for both L-band and C-band signals comprising the steps of passing both L-band and C-band signals through a common amplification stage which provides greater gain for the signals in one band than is provided for signals in the other band and reflecting the other band signals to pass through the common amplification stage at least one additional time.

* * * * *

UNITED STATES PATENT AND TRADEMARK OFFICE
CERTIFICATE OF CORRECTION

PATENT NO. : 6,049,418
DATED : April 11, 2000
INVENTOR(S) : Atul Kumar Srivastava, James W. Sulhoff, Yan Sun, Paul Francis Wysocki It is certified that error appears in the above-identified patent and that said Letters Patent is hereby corrected as shown below:

<u>Column 1,</u>
Line 2, after the title insert --
ACKNOWLEDGEMENT OF GOVERNMENTAL RIGHTS --

This invention was made with Government support under Agreement No. MDA 972-94-3-0036 awarded by ARPA. The Government has certain rights in the invention.

Signed and Sealed this

Twenty-seventh Day of November, 2001

Attest:

*Nicholas P. Godici*

*Attesting Officer*

NICHOLAS P. GODICI
*Acting Director of the United States Patent and Trademark Office*